(12) United States Patent
Craig et al.

(10) Patent No.: US 9,788,485 B2
(45) Date of Patent: Oct. 17, 2017

(54) VARIABLE SPEED ELEVATOR CONTROL SYSTEM

(71) Applicant: Deere & Company, Moline, IL (US)

(72) Inventors: Paul I. Craig, Thibodaux, LA (US); John A Dighton, Thibodaux, LA (US)

(73) Assignee: DEERE & COMPANY, Moline, IL (US)

( * ) Notice: Subject to any disclaimer, the term of this patent is extended or adjusted under 35 U.S.C. 154(b) by 73 days.

(21) Appl. No.: 14/921,523

(22) Filed: Oct. 23, 2015

(65) Prior Publication Data

US 2017/0112059 A1 Apr. 27, 2017

(51) Int. Cl.
 *A01D 41/14* (2006.01)
 *A01D 41/127* (2006.01)
 *A01D 46/08* (2006.01)
 *A01D 45/10* (2006.01)
 *A01D 61/00* (2006.01)
 *A01D 101/00* (2006.01)

(52) U.S. Cl.
 CPC ......... *A01D 41/1271* (2013.01); *A01D 45/10* (2013.01); *A01D 61/00* (2013.01); *A01D 2101/00* (2013.01)

(58) Field of Classification Search
 CPC .. A01D 41/127; A01D 41/1274; A01D 45/10; A01D 41/1271; A01D 43/085; A01D 69/00
 See application file for complete search history.

(56) References Cited

U.S. PATENT DOCUMENTS

| 2,648,943 | A | * | 8/1953 | Shafer | A01D 45/10 56/11.9 |
| 3,470,681 | A | * | 10/1969 | Saemann | A01D 41/1274 198/507 |
| 3,609,947 | A | * | 10/1971 | Herbsthofer | A01D 41/1274 460/6 |
| 3,871,162 | A | * | 3/1975 | Schexnayder, Jr. | A01D 45/10 56/14.3 |
| 4,049,058 | A | * | 9/1977 | Eisenhardt | A01D 27/00 171/58 |
| 4,483,129 | A | * | 11/1984 | Lester | A01D 45/10 56/11.9 |
| 5,031,392 | A | * | 7/1991 | Baker | A01D 45/10 460/123 |
| 5,282,389 | A |  | 2/1994 | Faivre et al. |  |
| 5,326,320 | A | * | 7/1994 | von Allwoerden | A01D 43/10 460/149 |

(Continued)

*Primary Examiner* — Arpad Fabian-Kovacs

(57) ABSTRACT

A control system for a sugarcane harvester. The sugarcane harvester comprises lower feed rollers and upper feed rollers configured to feed cut sugarcane through the sugarcane harvester. An elevator is configured to transport sugarcane out of the sugarcane harvester at an elevator speed. The control system controls the elevator speed based on a crop mass flow through the plurality of lower and upper feed rollers. The control system comprises at least one crop mass flow feedback device providing a crop mass flow feedback signal indicative of the crop mass flow. A controller is in communication with the at least one crop mass flow feedback device and configured to lower the elevator speed when the crop mass flow feedback signal indicates a lower crop mass flow and raise the elevator speed when the crop mass flow feedback signal indicates a higher crop mass flow.

20 Claims, 3 Drawing Sheets

(56) References Cited

U.S. PATENT DOCUMENTS

| | | | |
|---|---|---|---|
| 6,272,819 B1 | 8/2001 | Wendte et al. | |
| 6,315,658 B1 * | 11/2001 | Weber | A01D 41/127 460/6 |
| 6,363,700 B1 * | 4/2002 | Fowler | A01D 45/10 56/13.3 |
| 6,508,049 B1 | 1/2003 | Cox et al. | |
| 7,165,628 B2 * | 1/2007 | Taylor | A01D 19/04 171/112 |
| 7,872,587 B2 * | 1/2011 | Hindryckx | A01D 41/127 340/684 |
| 2005/0150202 A1 * | 7/2005 | Quick | A01D 41/127 56/10.2 R |
| 2010/0269470 A1 * | 10/2010 | Price | A01D 45/10 56/10.2 H |
| 2014/0262548 A1 | 9/2014 | Acheson et al. | |
| 2015/0124054 A1 * | 5/2015 | Darr | G01F 22/00 348/46 |
| 2015/0331408 A1 * | 11/2015 | Richard | A01D 45/10 700/114 |
| 2015/0342118 A1 * | 12/2015 | Corbett | A01D 41/127 73/114.25 |
| 2017/0049051 A1 * | 2/2017 | Cleodolphi | A01D 41/1274 |

\* cited by examiner

VARIABLE SPEED ELEVATOR CONTROL SYSTEM

FIELD OF THE DISCLOSURE

The present disclosure generally relates to harvesters, and more particularly to a variable speed elevator control system for a sugarcane harvester.

BACKGROUND OF THE DISCLOSURE

In order to transport crops from a harvester to a wagon, an elevator is commonly used that pulls a slat along a fixed floor at a fixed speed to move the crop.

SUMMARY OF THE DISCLOSURE

In one embodiment, a sugarcane harvester is disclosed. The sugarcane harvester comprises a basecutter configured to cut sugarcane. A plurality of lower feed rollers and a plurality of upper feed rollers are in communication with the basecutter to receive and feed the cut sugarcane through the sugarcane harvester. A chopping device is in communication with the plurality of lower and upper feed rollers. The chopping device is configured to chop the cut sugarcane into billets. An elevator is in communication with the chopping device. The elevator is configured to transport the billets out of the sugarcane harvester at an elevator speed. A control system is provided for controlling the elevator speed based on a crop mass flow through the plurality of lower and upper feed rollers. The control system comprises at least one crop mass flow feedback device that provides a crop mass flow feedback signal indicative of the crop mass flow. A controller is in communication with the at least one crop mass flow feedback device and is configured to lower the elevator speed when the crop mass flow feedback signal indicates a lower crop mass flow and raise the elevator speed when the crop mass flow feedback signal indicates a higher crop mass flow.

In another embodiment, a control system for a sugarcane harvester is disclosed. The sugarcane harvester comprises a plurality of lower feed rollers and a plurality of upper feed rollers configured to feed cut sugarcane through the sugarcane harvester. An elevator is configured to transport sugarcane out of the sugarcane harvester at an elevator speed. The control system controls the elevator speed based on a crop mass flow through the plurality of lower and upper feed rollers. The control system comprises at least one crop mass flow feedback device providing a crop mass flow feedback signal indicative of the crop mass flow. A controller is in communication with the at least one crop mass flow feedback device and configured to lower the elevator speed when the crop mass flow feedback signal indicates a lower crop mass flow and raise the elevator speed when the crop mass flow feedback signal indicates a higher crop mass flow.

In yet another embodiment, a sugarcane harvester is disclosed. The sugarcane harvester comprises a basecutter configured to cut sugarcane. A plurality of lower feed rollers and a plurality of upper feed rollers that are movable from a first position to a second position are provided. The lower and upper feed rollers are in communication with the basecutter to receive and feed the cut sugarcane through the sugarcane harvester. A chopping device is in communication with the plurality of lower and upper feed rollers. The chopping device is configured to chop the cut sugarcane into billets. An elevator is in communication with the chopping device. The elevator is configured to transport the billets out of the sugarcane harvester at an elevator speed. A control system is provided for controlling the elevator speed based on a crop mass, or volumetric, flow through the plurality of lower and upper feed rollers. The control system comprises at least one crop mass, or volumetric, flow feedback device configured to measure a distance moved by the upper feed rollers and provide a crop mass, or volumetric, flow feedback signal indicative of the crop mass, or volumetric, flow. A controller is in communication with the at least one crop mass flow feedback device and is configured to relate the distance moved to a crop mass, or volumetric, flow using a lookup table. The controller is configured to lower the elevator speed when the crop mass, or volumetric, flow feedback signal indicates a lower crop mass flow and raise the elevator speed when the crop mass, or volumetric, flow feedback signal indicates a higher crop mass flow.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
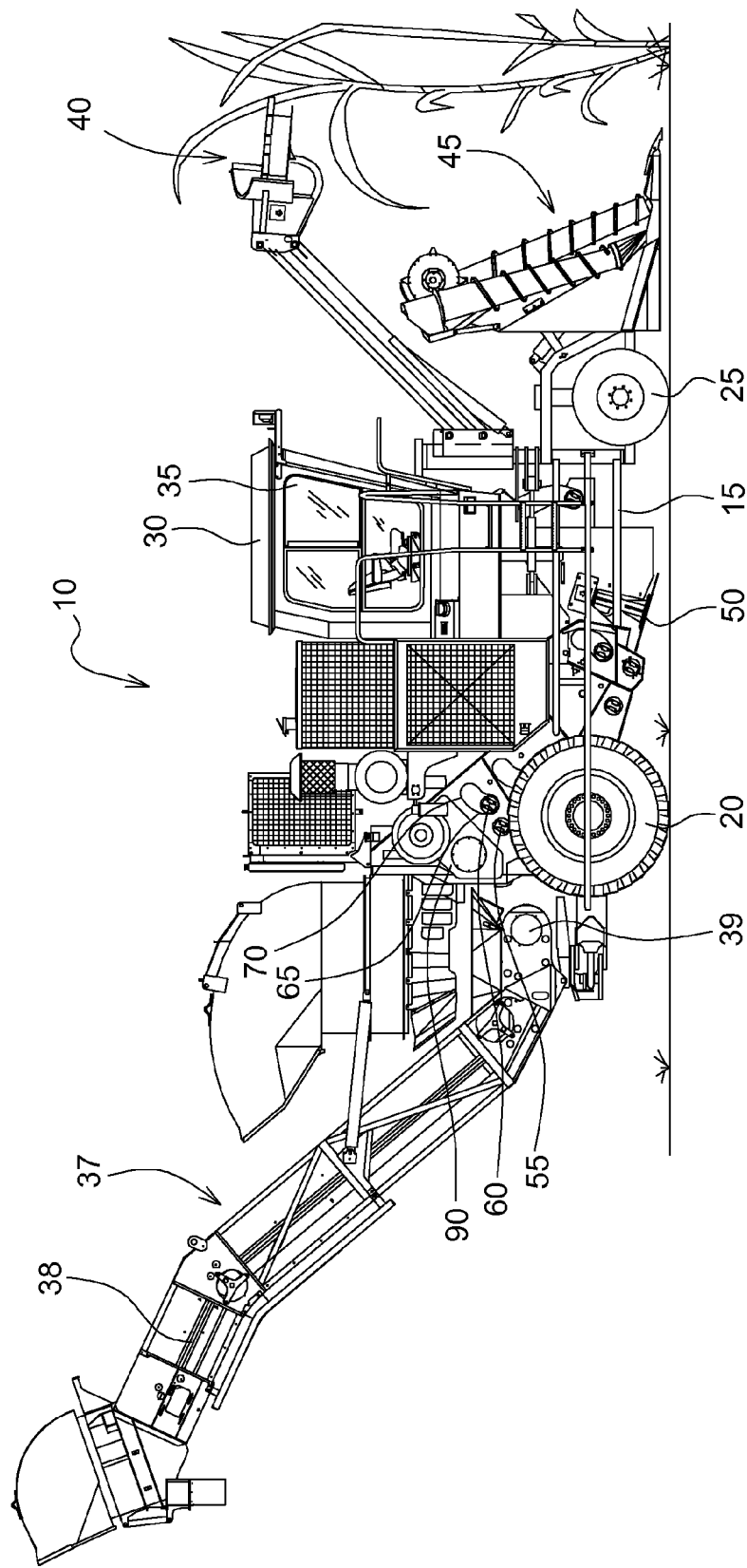
FIG. 1 is a side view of a sugarcane harvester according to one embodiment.
Figure 2:
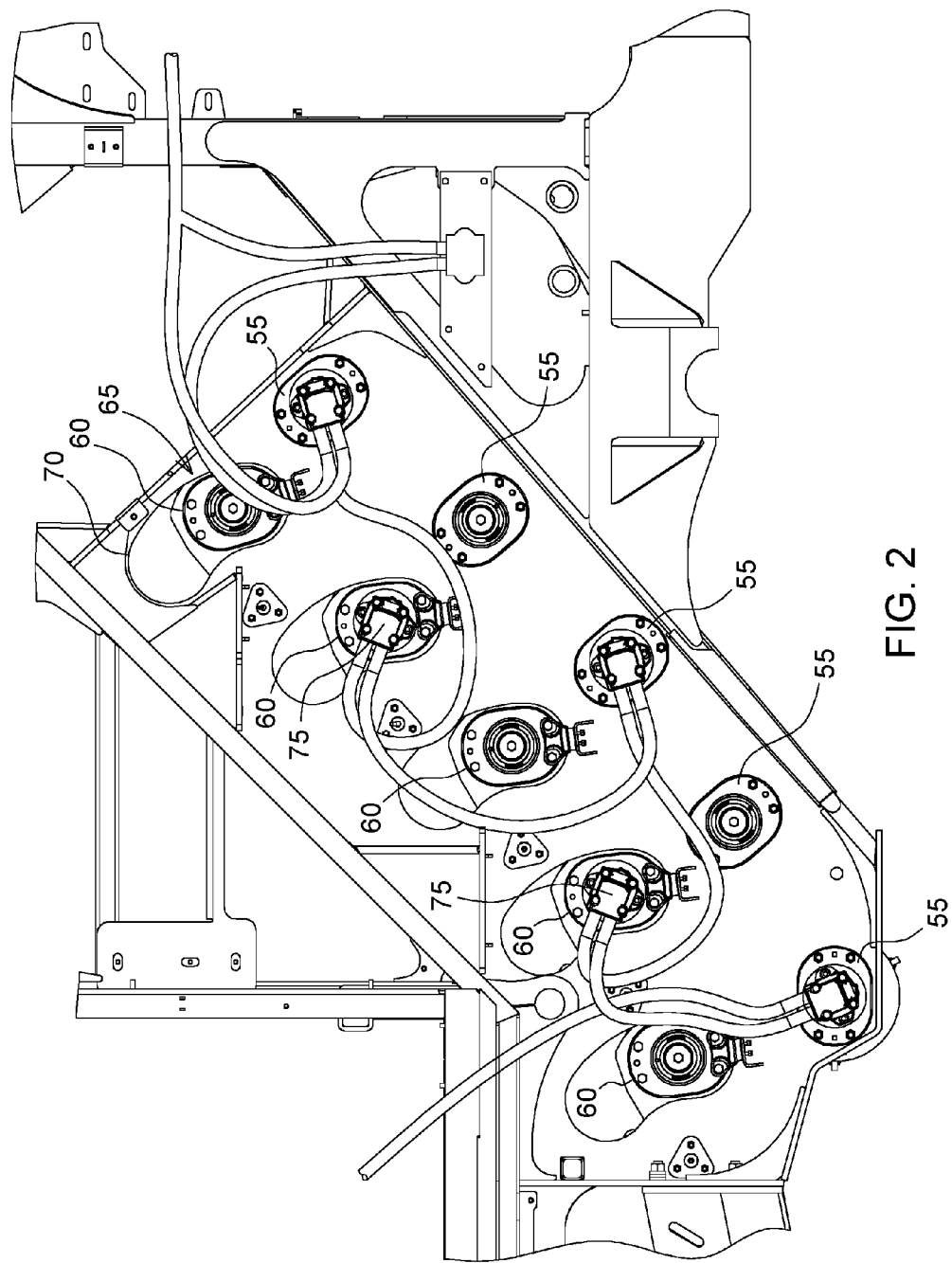
FIG. 2 is a zoomed in view of a portion of a sugarcane harvester according to another embodiment.

FIG. 1 illustrates a harvester 10, depicted as a wheeled sugarcane harvester. The harvester 10 includes a frame 15 supported on a pair of rear drive wheels 20 and a pair of steerable front wheels 25, only one of which is shown. It is also contemplated that the front wheels 25 could also be powered or tracks (not shown) could be used to support the harvester 10. An operator station 30 is located at a central, forward location of the frame 15, and located behind the operator station 30 is an engine (not shown), which provides the power for driving the wheels 20 and other driven components of the harvester 10. An operator interface 35 is coupleable to the operator station 30 and enables an operator to set an elevator speed of the elevator 37. An elevator belt 38 is rotated by an elevator motor 39 at the elevator speed.

The operator station 30 gives a seated or standing operator a vantage point for viewing the operation of front-mounted equipment including a topper mechanism 40 mounted to the frame 15 between right- and left-hand crop divider assemblies 45. Located just behind and inwardly of the front wheels 25 of the harvester 10, so as to be at opposite sides of a longitudinal centerline of the harvester, are right- and left-hand basecutters 50, only one of which is shown, having cutting blades located so as to overlap at the middle of the harvester 10.

Thus, during operation, the crop divider assemblies 45 straddle a row of cane stalks which pass beneath the frame 15 and are severed from the ground by the basecutters 50. The basecutters 50 provide the cut stalks to a plurality of lower feed rollers 55 and a plurality of upper feed rollers 60 in communication with the basecutters 50 to receive and feed the cut sugarcane through the harvester 10. The plurality of upper feed rollers 60 are movable from a first position 65 to a second position 70 to enable varying volumes of cut sugarcane to pass. The plurality of upper feed rollers 60 are movable from the first position 65 to the second position 70, that is higher than the first position 65, along a linear or non-linear path.

At least one crop mass, or volumetric, flow feedback device 75 is configured to provide a crop mass, or volumetric, flow feedback signal indicative of the crop mass flow or crop volumetric flow. Mass flow is a dynamic mass per time unit. Mass flow can be calculated from a volumetric flow when the temperature and pressure are known. It is common to specify mass flow in terms of volumetric flow at standard conditions. Both mass flow and volumetric flow are contemplated by this disclosure. In the illustrated embodiment, the crop mass flow feedback device 75 may be a height sensor 77 (FIG. 3) that measures the distance moved by the plurality of upper feed rollers 60. In another embodiment, the plurality of upper feed rollers 60 may be two upper feed rollers 60 and the at least one crop mass flow feedback device 75 may be two crop mass flow feedback devices 75 positioned adjacent the upper feed rollers 60 and the distance moved may be an average of the distance moved by each upper feed roller 60. Alternatively, the at least one crop mass flow feedback device 75 may be configured to measure an angle of pivot. A controller 80 (FIG. 3) relates the distance moved or angle of pivot to crop mass flow using a lookup table 85.

The plurality of lower and upper feed rollers 55, 60 transport the cane stalks to a chopping device 90 located between and at a height above the rear drive wheels 20. The chopping device 90 is in communication with the plurality of lower and upper feed rollers 55, 60. The chopping device 90 is configured to chop the cut sugarcane into billets. The elevator 37 is in communication with the chopping device 90. The elevator 37 is configured to transport the billets out of the sugarcane harvester 10 at the elevator speed.

Figure 3:
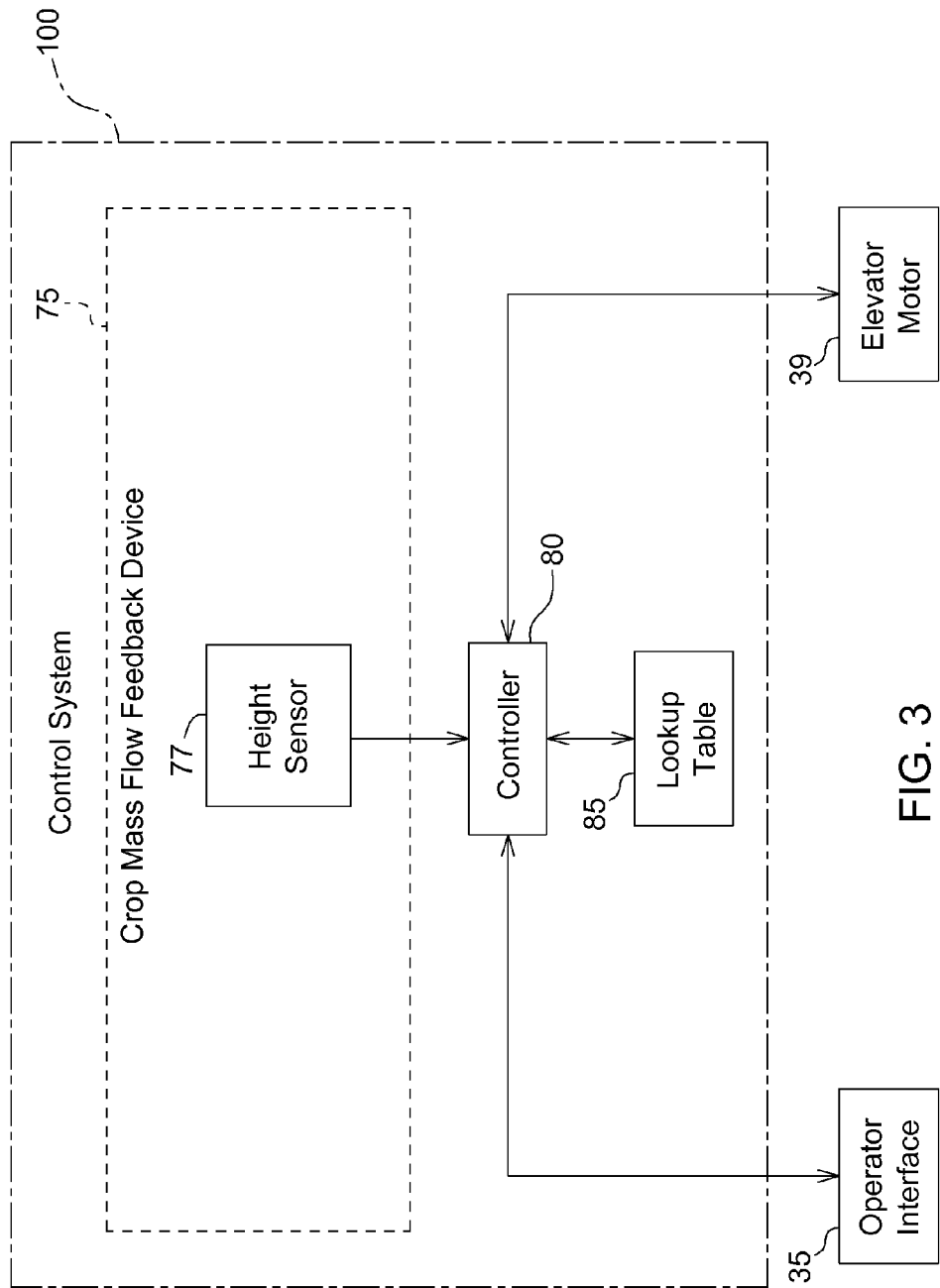
FIG. 3 is a schematic of a control system of a sugarcane harvester according to yet another embodiment.

With reference to FIG. 3, the harvester 10 has a control system 100 for controlling the elevator speed based on a crop mass flow through the plurality of lower and upper feed rollers 55, 60. The control system 100 comprises the at least one crop mass flow feedback device 75 and the controller 80 that is in communication with the at least one crop mass flow feedback device 75. The control system 100 is configured to lower the elevator speed when the crop mass flow feedback signal indicates a lower crop mass flow and raise the elevator speed when the crop mass flow feedback signal indicates a higher crop mass flow.

The controller 80 of the control system 100 may be configured to delay before lowering the elevator speed when the crop mass flow feedback signal indicates a lower crop mass flow. The delay may be from about 5 seconds to about 10 seconds. Other delay periods are also contemplated.

Various features are set forth in the following claims.

What is claimed is:

1. A sugarcane harvester, comprising:
a basecutter configured to cut sugarcane;
a plurality of lower feed rollers and a plurality of upper feed rollers in communication with the basecutter to receive and feed the cut sugarcane through the sugarcane harvester;
a chopping device in communication with the plurality of lower and upper feed rollers, the chopping device configured to chop the cut sugarcane into billets;
an elevator in communication with the chopping device, the elevator configured to transport the billets out of the sugarcane harvester at an elevator speed; and
a control system for controlling the elevator speed based on a crop mass flow through the plurality of lower and upper feed rollers, the control system comprising:
at least one crop mass flow feedback device providing a crop mass flow feedback signal indicative of the crop mass flow; and
a controller in communication with the at least one crop mass flow feedback device and configured to lower the elevator speed when the crop mass flow feedback signal indicates a lower crop mass flow and raise the elevator speed when the crop mass flow feedback signal indicates a higher crop mass flow.

2. The sugarcane harvester of claim 1, wherein the plurality of upper feed rollers are movable from a first position to a second position and the at least one crop mass flow feedback device is configured to measure a distance moved and the controller relates the distance moved to crop mass flow using a lookup table.

3. The sugarcane harvester of claim 1, wherein the plurality of upper feed rollers are movable from a first position to a second position and the at least one crop mass flow feedback device is configured to measure an angle of pivot and the controller relates the angle of pivot to crop mass flow using a lookup table.

4. The sugarcane harvester of claim 1, wherein the controller is configured to delay before lowering the elevator speed when the crop mass flow feedback signal indicates a lower crop mass flow.

5. The sugarcane harvester of claim 4, wherein the delay is from about 5 seconds to about 10 seconds.

6. The sugarcane harvester of claim 2, wherein the plurality of upper feed rollers is two upper feed rollers and the at least one crop mass flow feedback device is two crop mass flow feedback devices positioned adjacent each of the upper feed rollers and the distance moved is an average of the distance moved by each upper feed roller.

7. The sugarcane harvester of claim 2, wherein the plurality of upper feed rollers are movable from the first position to the second position along a non-linear path.

8. A control system for a sugarcane harvester having a plurality of lower feed rollers and a plurality of upper feed rollers configured to feed cut sugarcane through the sugarcane harvester and an elevator configured to transport sugarcane out of the sugarcane harvester at an elevator speed, the control system for controlling the elevator speed based on a crop mass flow through the plurality of lower and upper feed rollers, the control system comprising:
at least one crop mass flow feedback device providing a crop mass flow feedback signal indicative of the crop mass flow; and
a controller in communication with the at least one crop mass flow feedback device and configured to lower the elevator speed when the crop mass flow feedback signal indicates a lower crop mass flow and raise the elevator speed when the crop mass flow feedback signal indicates a higher crop mass flow.

9. The control system of claim 8, wherein the plurality of upper feed rollers are movable from a first position to a second position and the at least one crop mass flow feedback device is configured to measure a distance moved and the controller relates the distance moved to crop mass flow using a lookup table.

10. The control system of claim 8, wherein the plurality of upper feed rollers are movable from a first position to a second position and the at least one crop mass flow feedback device is configured to measure an angle of pivot and the controller relates the angle of pivot to crop mass flow using a lookup table.

11. The control system of claim 8, wherein the controller is configured to delay before lowering the elevator speed when the crop mass flow feedback signal indicates a lower crop mass flow.

12. The control system of claim 11, wherein the delay is from about 5 seconds to about 10 seconds.

13. The control system of claim 9, wherein the plurality of upper feed rollers is two upper feed rollers and the at least one crop mass flow feedback device is two crop mass flow feedback devices positioned adjacent each of the upper feed rollers and the distance moved is an average of the distance moved by each upper feed roller.

14. The control system of claim 9, wherein the plurality of upper feed rollers are movable from the first position to the second position along a non-linear path.

15. A sugarcane harvester, comprising:
   a basecutter configured to cut sugarcane;
   a plurality of lower feed rollers and a plurality of upper feed rollers that are movable from a first position to a second position, the lower and upper feed rollers are in communication with the basecutter to receive and feed the cut sugarcane through the sugarcane harvester;
   a chopping device in communication with the plurality of lower and upper feed rollers, the chopping device configured to chop the cut sugarcane into billets;
   an elevator in communication with the chopping device, the elevator configured to transport the billets out of the sugarcane harvester at an elevator speed; and
   a control system for controlling the elevator speed based on a crop mass flow through the plurality of lower and upper feed rollers, the control system comprising:
      at least one crop mass flow feedback device configured to measure a distance moved by the upper feed rollers and provide a crop mass flow feedback signal indicative of the crop mass flow; and
      a controller in communication with the at least one crop mass flow feedback device and configured to relate the distance moved to a crop mass flow using a lookup table, the controller configured to lower the elevator speed when the crop mass flow feedback signal indicates a lower crop mass flow and raise the elevator speed when the crop mass flow feedback signal indicates a higher crop mass flow.

16. The sugarcane harvester of claim 15, wherein the controller is configured to delay before lowering the elevator speed when the crop mass flow feedback signal indicates a lower crop mass flow.

17. The sugarcane harvester of claim 16, wherein the delay is from about 5 seconds to about 10 seconds.

18. The sugarcane harvester of claim 15, wherein the plurality of upper feed rollers is two upper feed rollers and the at least one crop mass flow feedback device is two crop mass flow feedback devices positioned adjacent each of the upper feed rollers and the distance moved is an average of the distance moved by each upper feed roller.

19. The sugarcane harvester of claim 15, wherein the plurality of upper feed rollers are movable from the first position to the second position along a non-linear path.

20. The sugarcane harvester of claim 15, wherein the crop mass flow feedback device is a crop volumetric flow feedback device configured to measure a distance moved by the upper feed rollers and provide a crop volumetric flow feedback signal indicative of the crop volumetric flow.

* * * * *